US012340761B2

(12) United States Patent
Liu et al.

(10) Patent No.: US 12,340,761 B2
(45) Date of Patent: Jun. 24, 2025

(54) DISPLAY PANEL, DRIVING METHOD FOR DISPLAY PANEL, AND DISPLAY DEVICE

(71) Applicant: HEFEI VISIONOX TECHNOLOGY CO., LTD., Hefei (CN)

(72) Inventors: Yunjie Liu, Hefei (CN); Yang Shao, Hefei (CN)

(73) Assignee: Hefei Visionox Technology Co., Ltd., Hefei (CN)

( * ) Notice: Subject to any disclaimer, the term of this patent is extended or adjusted under 35 U.S.C. 154(b) by 0 days.

(21) Appl. No.: 18/647,352

(22) Filed: Apr. 26, 2024

(65) Prior Publication Data

US 2024/0420649 A1 Dec. 19, 2024

Related U.S. Application Data

(63) Continuation of application No. PCT/CN2023/134563, filed on Nov. 28, 2023.

(30) Foreign Application Priority Data

Jun. 13, 2023 (CN) ........................ 202310707183.X

(51) Int. Cl.
*G09G 3/3291* (2016.01)
*G09G 3/3233* (2016.01)

(52) U.S. Cl.
CPC ......... *G09G 3/3291* (2013.01); *G09G 3/3233* (2013.01); *G09G 2300/0842* (2013.01); *G09G 2330/021* (2013.01)

(58) Field of Classification Search
CPC ............... G09G 3/3291; G09G 3/3233; G09G 2300/0842; G09G 2330/021
See application file for complete search history.

(56) References Cited

U.S. PATENT DOCUMENTS

| | | | | |
|---|---|---|---|---|
| 2012/0056913 A1* | 3/2012 | Akimoto | .............. | G09G 3/3233 345/690 |
| 2020/0343319 A1* | 10/2020 | Matsueda | ............ | H10K 59/131 |
| 2023/0125275 A1 | 4/2023 | Mi | | |

FOREIGN PATENT DOCUMENTS

| | | |
|---|---|---|
| CN | 108364608 A | 8/2018 |
| CN | 111489703 A | 8/2020 |

(Continued)

OTHER PUBLICATIONS

International Search Report issued Mar. 4, 2024, in corresponding International Application No. PCT/CN2023/134563, 14 pages.

*Primary Examiner* — Stacy Khoo
(74) *Attorney, Agent, or Firm* — Maier & Maier, PLLC

(57) ABSTRACT

A display panel, a driving method for a display panel, and a display device. The display panel includes a display region, a non-display region, multiple sub-pixels, and at least one reused signal line; each sub-pixel includes a pixel circuit and a light-emitting device; in the pixel circuit, the initialization module is configured to write the initialization voltage to at least one of a control terminal of the drive module and an anode of the light-emitting device; in each sub-pixel, an input terminal of the initialization module in the pixel circuit and a cathode of the light-emitting device are connected to one reused signal line; and each reused signal line is configured to, in an initialization stage, provide the initialization voltage for the initialization module and in a light emission stage, provide the cathode voltage for the cathode of the light-emitting device.

20 Claims, 7 Drawing Sheets

(56) References Cited

FOREIGN PATENT DOCUMENTS

| | | | |
|---|---|---|---|
| CN | 111668270 | A | 9/2020 |
| CN | 111986612 | A | 11/2020 |
| CN | 112885291 | A | 6/2021 |

* cited by examiner

DISPLAY PANEL, DRIVING METHOD FOR DISPLAY PANEL, AND DISPLAY DEVICE

CROSS-REFERENCE TO RELATED APPLICATIONS

This is a continuation of International Patent Application No. PCT/CN2023/134563, filed Nov. 28, 2023, which claims priority to Chinese Patent Application No. 202310707183.X filed with the China National Intellectual Property Administration (CNIPA) on Jun. 13, 2023, the disclosures of which are incorporated herein by reference in their entireties.

TECHNICAL FIELD

Embodiments of the present application relate to the field of display technologies, for example, a display panel, a driving method for a display panel, and a display device.

BACKGROUND

With the gradual development of organic light-emitting diodes (OLEDs), the requirements for circuit settings of OLED display panels are becoming increasingly higher.

The OLED display panels have a large number of wires and wiring difficulty.

SUMMARY

Embodiments of the present application provide a display panel, a driving method for a display panel, and a display device to reduce the number of wires and the wiring difficulty of the display panel.

The present application provides a display panel including a display region, a non-display region at least partially surrounding the display region, multiple sub-pixels, and at least one reused signal line.

The multiple sub-pixels are located in the display region; each sub-pixel includes a pixel circuit and a light-emitting device; the pixel circuit includes a drive module, an initialization module, a data write module, and a storage module; the data write module is configured to transmit a data voltage to the drive module; the storage module is configured to store the voltage of a control terminal of the drive module; the drive module is configured to generate a drive current according to the voltage of the control terminal of the drive module to drive the light-emitting device to emit light; and the initialization module is configured to write the initialization voltage into at least one of the control terminal of the drive module and an anode of the light-emitting device.

For each sub-pixel, an input terminal of the initialization module in the pixel circuit and a cathode of the light-emitting device are electrically connected to one reused signal line; and each reused signal line is configured to, in an initialization stage, provide the initialization voltage for the initialization module connected to the reused signal line and in a light emission stage, provide a cathode voltage for a cathode of the light-emitting device connected to the reused signal line.

In some embodiments, the multiple sub-pixels include at least one first sub-pixel, at least one second sub-pixel, and at least one third sub-pixel; and the at least one reused signal line includes a first reused signal line, a second reused signal line, and a third reused signal line.

In the at least one first sub-pixel, the input terminal of the initialization module in the pixel circuit and the cathode of the light-emitting device are electrically connected to the first reused signal line.

In the at least one second sub-pixel, the input terminal of the initialization module in the pixel circuit and the cathode of the light-emitting device are electrically connected to the second reused signal line.

In the at least one third sub-pixel, the input terminal of the initialization module in the pixel circuit and the cathode of the light-emitting device are electrically connected to the third reused signal line.

In some embodiments, the at least one reused signal line includes multiple reused signal lines, and the multiple reused signal lines are configured to provide different cathode voltages for cathodes of light-emitting devices of different types of sub-pixels, respectively.

In some embodiments, the at least one reused signal line includes multiple reused signal lines, and the multiple reused signal lines are configured to be electrically connected to different output terminals of a driver chip, respectively.

In some embodiments, the multiple reused signal lines are configured to transmit different initialization voltages to input terminals of initialization modules of different types of sub-pixels, respectively.

In some embodiments, the pixel circuit of each sub-pixel further includes at least one light emission control module; the at least one light emission control module, the drive module, and the light-emitting device are connected between a power signal line and one reused signal line, and the at least one light emission control module is configured to, in the light emission stage, control the light-emitting device to be connected to the power signal line and control the light-emitting device to be connected to the reused signal line connected to the light-emitting device.

In some embodiments, the at least one light emission control module includes a first light emission control transistor, a second light emission control transistor, and a third light emission control transistor. A first electrode of the first light emission control transistor is connected to the power signal line, a second electrode of the first light emission control transistor is connected to a first terminal of the drive module, a second terminal of the drive module is connected to a first electrode of the second light emission control transistor, a second electrode of the second light emission control transistor is connected to the anode of the light-emitting device, a first electrode of the third light emission control transistor is connected to the cathode of the light-emitting device, and a second electrode of the third light emission control transistor is connected to the reused signal line.

A gate of the first light emission control transistor, a gate of the second light emission control transistor, and a gate of the third light emission control transistor are all connected to a light emission control signal line.

In some embodiments, the initialization module includes at least one of a first initialization module and a second initialization module.

A first terminal of the first initialization module is electrically connected to the reused signal line, a second terminal of the first initialization module is electrically connected to the anode of the light-emitting device, and a control terminal of the first initialization module is configured to receive a first gate signal.

A first terminal of the second initialization module is electrically connected to the reused signal line, a second terminal of the second initialization module is electrically connected to the control terminal of the drive module, and a control terminal of the second initialization module is configured to receive a second gate signal.

In some embodiments, cathodes of light-emitting devices of part of the multiple sub-pixels are electrically connected, and the light-emitting devices are configured to emit light of the same color.

In some embodiments, cathodes of light-emitting devices of part of the multiple sub-pixels are integrally connected to form at least one cathode bar; or cathodes of light-emitting devices of part of the multiple sub-pixels are electrically connected through a connection wire.

In some embodiments, the at least one cathode bar includes multiple first cathode bars, multiple second cathode bars, and multiple third cathode bars; the multiple sub-pixels are arranged in an array; and first sub-pixels of the multiple sub-pixels emit light of the same color, second sub-pixels of the multiple sub-pixels emit light of the same color, and third sub-pixels of the multiple sub-pixels emit light of the same color.

Cathodes of light-emitting devices in first sub-pixels in the same column are integrally connected to form one first cathode bar, and each first cathode bar is electrically connected to the first reused signal line in the non-display region of the display panel.

Cathodes of light-emitting devices in second sub-pixels in the same column are integrally connected to form one second cathode bar, and each second cathode bar is electrically connected to the second reused signal line in the non-display region of the display panel.

Cathodes of light-emitting devices in third sub-pixels in the same column are integrally connected to form one third cathode bar, and each third cathode bar is electrically connected to the third reused signal line in the non-display region of the display panel.

In some embodiments, in each sub-pixel, the first terminal of the initialization module is electrically connected to the cathode of the light-emitting device through a via, or in each sub-pixel, the first terminal of the initialization module and the light-emitting device are electrically connected to the same cathode bar.

Alternatively, the display panel further includes multiple signal transmission lines located in the display region, each signal transmission line is electrically connected to cathodes of light-emitting devices in one row or column and electrically connected to the reused signal line, and the reused signal line is configured to transmit the cathode voltage to the cathodes of the light-emitting devices through each signal transmission line.

The present application provides a driving method for a display panel. The method is used for driving the display panel according to any embodiment of the present application and includes the steps described below.

In the initialization stage, the initialization module is turned on, and the reused signal line is controlled to provide the initialization voltage for at least one of the anode of the light-emitting device and the control terminal of the drive module.

In a data write stage, the data write module is controlled to transmit the data voltage to the control terminal of the drive module.

In the light emission stage, the initialization module is turned off, the reused signal line is controlled to provide the cathode voltage for the cathode of the light-emitting device, and the drive module is controlled to output the drive current to the light-emitting device to drive the light-emitting device to emit light.

In some embodiments, the step of controlling the reused signal line to provide the cathode voltage for the cathode of the light-emitting device and controlling the drive module to output the drive current to the light-emitting device to drive the light-emitting device to emit light includes the steps described below.

The at least one light emission control module included in the pixel circuit is controlled to be turned on so that the reused signal line is electrically connected to the cathode of the light-emitting device, and the cathode voltage is transmitted to the cathode of the light-emitting device through the reused signal line.

The at least one light emission control module is controlled to be turned on so that a power signal line is electrically connected to the drive module and the drive module is electrically connected to the anode of the light-emitting device, and thus the drive current is output to the light-emitting device through the drive module.

The at least one light emission control module, the drive module, and the light-emitting device are connected between the power signal line and the reused signal line.

The present application provides a display device including the display panel according to any embodiment of the present application.

In the technical schemes provided in the embodiments of the present application, at least one reused signal line is provided in the display panel, and of each sub-pixel, the input terminal of the initialization module in the pixel circuit and the cathode of the light-emitting device are electrically connected to one reused signal line. The reused signal line is configured to provide the initialization voltage for the initialization module in the initialization stage and provide the cathode voltage for the cathode of the light-emitting device in the light emission stage so that the cathode wire is reused as the initialization signal line, the number of wires in the display panel can be reduced, and the complex wiring under independent cathode control of different sub-pixels in the display panel can be alleviated.

DETAILED DESCRIPTION

Terms such as "first" and "second" in the description, claims, and above drawings of the present application are used to distinguish between similar objects and are not necessarily used to describe a particular order or sequence. It is to be understood that data used in this manner are interchangeable where appropriate so that the embodiments of the present application described herein may also be implemented in a sequence not illustrated or described herein. Additionally, terms "including", "having", and any variations thereof are intended to encompass a non-exclusive inclusion. For example, in addition to a process, method, system, product, or device that includes a series of steps or units and that is shown in embodiments of the present application, other processes, methods, systems, products, or devices that include the series of steps or units and that are not expressly listed, or other steps or units that are inherent to such processes, methods, systems, products, or devices, may also be included.

Figure 1:
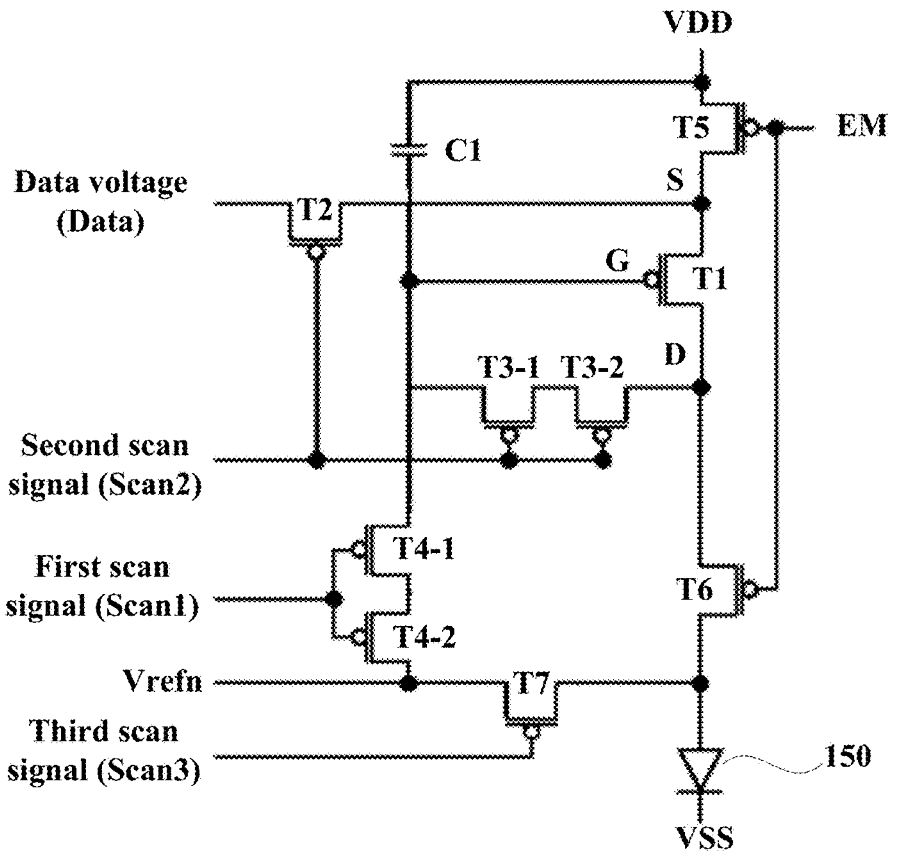
FIG. 1 is a structural diagram of a pixel circuit according to an embodiment.

FIG. 1 is a structural diagram of a pixel circuit according to an embodiment. Referring to FIG. 1, the OLED display panel includes multiple sub-pixels. Each sub-pixel includes a pixel circuit and a light-emitting device 150. The pixel circuit is connected to a scan signal line, a data signal line, an initialization signal line, and a power signal line, separately. The data signal line is configured to provide a data voltage Data for the pixel circuit. The scan signal line is configured to provide scan signals (scan signals Scan1/Scan2/Scan3) for the pixel circuit. The initialization signal line is configured to provide an initialization voltage Vrefn for the pixel circuit. The power signal line is configured to provide a power signal for the pixel circuit. The power signal line includes a first power signal line and a second power signal line. The first power signal line transmits a power voltage VDD to an anode of the light-emitting device 150, and the second power signal line transmits a cathode voltage VSS to a cathode of the light-emitting device 150. The second power signal line may be understood as a cathode wire, and the second power voltage may be understood as a cathode voltage. The cathode wire and the initialization wire of the sub-pixels in the display panel are set separately, increasing the number of wires and the wiring difficulty of the display panel. An embodiment of the present application provides a display panel in which a reused signal line is used for providing the initialization voltage for an initialization module in an initialization stage and providing the cathode voltage for the cathode of the light-emitting device in a light emission stage so that the cathode wire is reused as the initialization signal line, thereby reducing the number of wires and the wiring difficulty of the display panel.

Figure 2:
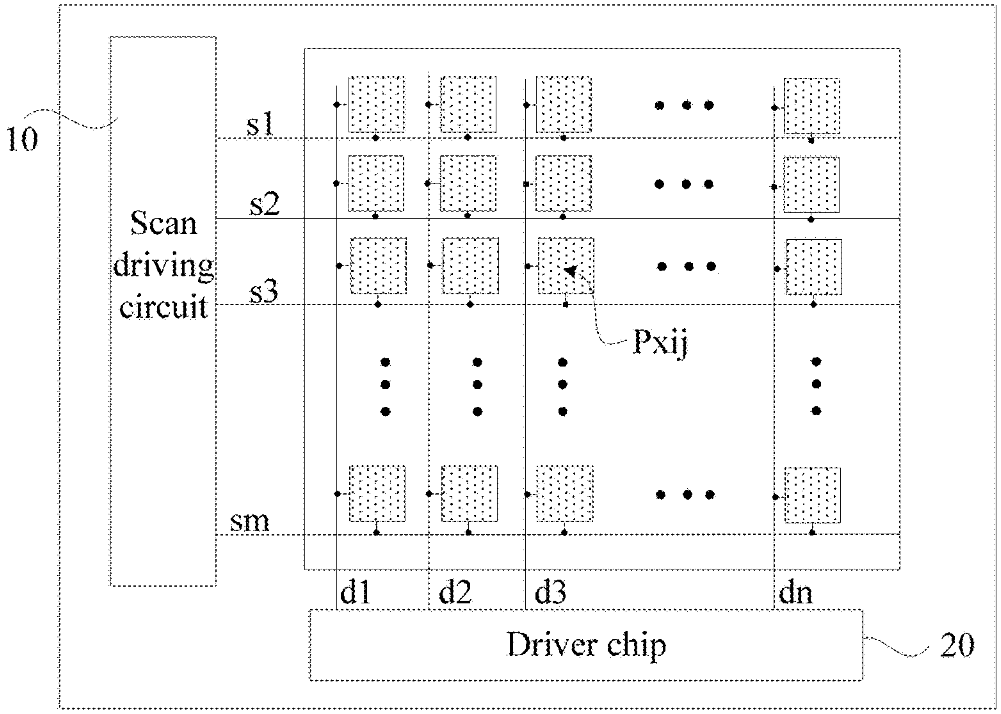
FIG. 2 is a structural diagram of a display panel according to an embodiment of the present application.
Figure 3:
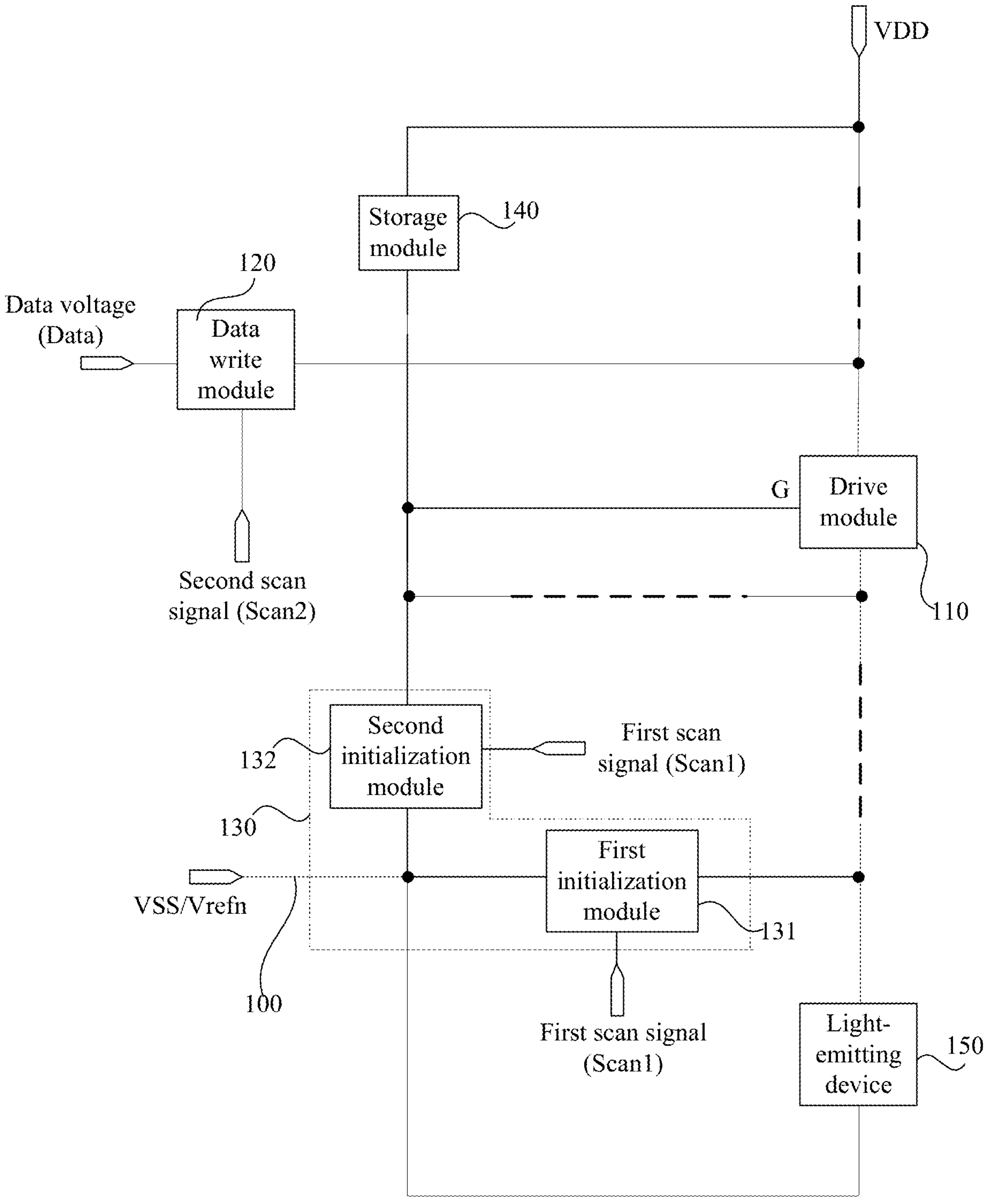
FIG. 3 is a structural diagram of a pixel circuit according to an embodiment of the present application.
Figure 4:
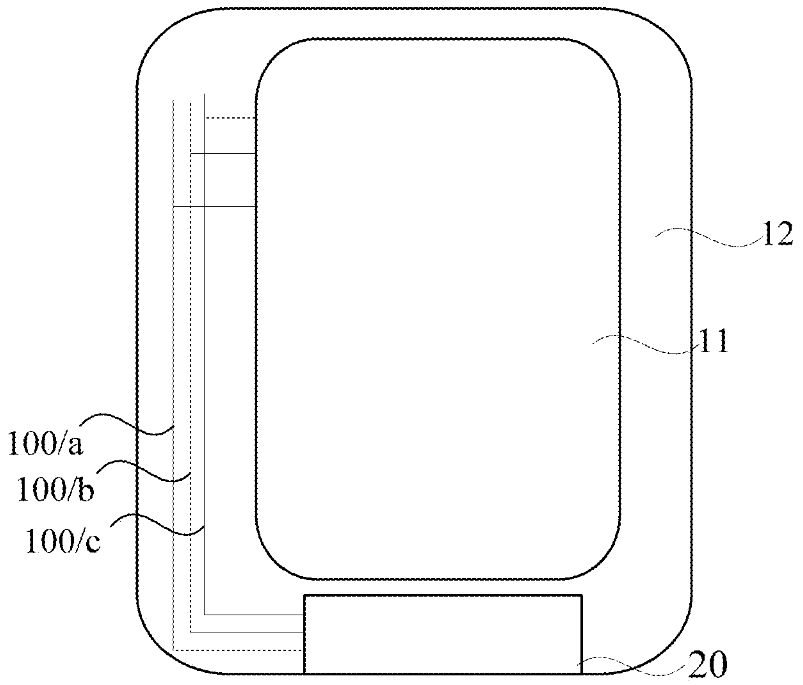
FIG. 4 is a structural diagram of a reused signal line according to an embodiment of the present application.

An embodiment of the present application provides a display panel. FIG. 2 is a structural diagram of a display panel according to an embodiment of the present application. FIG. 3 is a structural diagram of a pixel circuit according to an embodiment of the present application. FIG. 4 is a structural diagram of a reused signal line according to an embodiment of the present application. Referring to FIGS. 2 to 4, the display panel includes a display region 11, a non-display region 12 at least partially surrounding the display region 11, multiple sub-pixels, and at least one reused signal line 100.

The multiple sub-pixels are located in the display region 11. Each sub-pixel includes the pixel circuit and the light-emitting device 150. The pixel circuit includes a drive module 110, an initialization module 130, a data write module 120, and a storage module 140. The data write module 120 is configured to transmit a data voltage Data to the drive module 110. The storage module 140 is configured to store the voltage of a control terminal G of the drive module 110.

The drive module 110 is configured to generate a drive current according to the voltage of the control terminal G to drive the light-emitting device 150 to emit light. The initialization module 130 is configured to write the initialization voltage Vrefn into the control terminal G of the drive module 110 and/or the anode of the light-emitting device 150.

In each sub-pixel, an input terminal of the initialization module 130 in the pixel circuit and the cathode of the light-emitting device 150 are electrically connected to one reused signal line 100; and the reused signal line 100 is configured to provide the initialization voltage Vrefn for the initialization module 130 in the initialization stage and provide the cathode voltage VSS for the cathode of the light-emitting device 150 in the light emission stage.

The display panel includes the display region 11 and the non-display region 12. The non-display region 12 is located on at least one side of the display region 11. The non-display region 12 includes a scan driving circuit 10 and a driver chip 20 shown in FIG. 2. In other embodiments, the driver chip 20 may not be disposed on the display panel. The display region 11 includes an array substrate and a light-emitting structure layer disposed on the array substrate. The array substrate refers to a film structure that can provide a drive signal for the display panel and play a role in buffering, protecting, or supporting, and the array substrate includes a substrate and a driver circuit layer disposed on the substrate. The driver circuit layer includes multiple circuit units, multiple data signal lines (d1 to dn), multiple scan signal lines (s1 to sm), and multiple power signal lines. The driver chip 20 is electrically connected to the multiple data signal lines (d1 to dn) separately, and the scan driving circuit 10 is electrically connected to the multiple scan signal lines (s1 to sm) separately.

The light-emitting structure layer includes multiple light-emitting devices 150. A circuit unit and a light-emitting device 150 electrically connected to the circuit unit form one sub-pixel. The display region 11 includes multiple sub-pixels Pxij, where i and j may be natural numbers. The circuit unit includes at least the pixel circuit. Referring to FIG. 3, the pixel circuit is electrically connected to the scan signal line, the data signal line, and the power signal line separately. The data signal line is configured to provide the data voltage Data for the pixel circuit. The scan signal line includes a second scan signal line, and the second scan signal line is configured to provide a second scan signal Scan2 for the pixel circuit. The second scan signal Scan2 is configured to control an on-state of the data write module 120. When the second scan signal Scan2 controls the data write module 120 to be turned on, the data write module 120 is configured to transmit the data voltage Data on the data signal line to the drive module 110. The storage module 140 is electrically connected to the control terminal G of the drive module 110 and configured to store the voltage of the control terminal G of the drive module 110. The drive module 110 is electrically connected to the light-emitting device 150 and configured to generate the drive current according to the voltage of the control terminal G to drive the light-emitting device 150 to emit light.

An output terminal of the initialization module 130 may be electrically connected to the control terminal G of the drive module 110. Before the data write module 120 writes the data voltage Data on the data signal line into the control terminal G of the drive module 110 (the data write stage), the initialization module 130 is configured to write the initialization voltage Vrefn into the control terminal G of the drive module 110 to ensure that voltages related to the data voltage Data can be transmitted to the control terminal G of the drive module 110. The output terminal of the initialization module 130 may be electrically connected to the anode of the light-emitting device 150. Before the drive module 110 generates the drive current for driving the light-emitting device 150 to emit light (the light emission stage), the initialization module 130 may also be configured to write the initialization voltage Vrefn into the anode of the light-emitting device 150 to initialize the potential at the anode of the light-emitting device 150.

The initialization module 130 writing the initialization voltage Vrefn into the anode of the light-emitting device 150 may occur at the same stage as the initialization module 130 writing the initialization voltage Vrefn into the control terminal G of the drive module 110. Alternatively, the initialization module 130 writing the initialization voltage Vrefn into the anode of the light-emitting device 150 may occur at the same stage as the data write module 120 transmitting the data voltage Data on the data signal line to the drive module 110. Alternatively, the initialization module 130 writing the initialization voltage Vrefn into the anode of the light-emitting device 150 may occur after the data write module 120 transmits the data voltage Data on the data signal line to the drive module 110.

At least one reused signal line 100 is provided in the display panel. In FIG. 4, three reused signal lines disposed in the non-display region 12 of the display panel are illustrated as an example. The reused signal line 100 is configured to provide the initialization voltage Vrefn for the initialization module 130 in the initialization stage, which may be understood as that the reused signal line 100 is configured to provide the initialization voltage Vrefn for the initialization module 130 when the initialization module 130 writes the initialization voltage Vrefn into the control terminal G of the drive module 110 and provide the initialization voltage Vrefn for the initialization module 130 when the initialization module 130 writes the initialization voltage Vrefn into the anode of the light-emitting device 150. The initialization voltage Vrefn provided by the reused signal line 100 for the initialization module 130 in the initialization stage may be the same as or different from the cathode voltage VSS provided for the cathode of the light-emitting device 150 in the light emission stage. The voltage signal on the reused signal line 100 is controlled according to actual needs. Both the initialization voltage Vrefn and the cathode voltage VSS are negative voltages. In an embodiment, the absolute value of the initialization voltage Vrefn provided by the reused signal line 100 for the initialization module 130 in the initialization stage is less than the absolute value of the cathode voltage VSS provided for the cathode of the light-emitting device 150 in the light emission stage. The cathode voltage VSS is configured to be a negative value with a negative bias, thereby preventing the light-emitting device 150 from emitting light in a non-light emission stage.

In each sub-pixel, the input terminal of the initialization module 130 in the pixel circuit and the cathode of the light-emitting device 150 are electrically connected to the reused signal line 100; and the reused signal line 100 is used to provide the initialization voltage Vrefn for the initialization module 130 in the initialization stage and provide the cathode voltage VSS for the cathode of the light-emitting device 150 in the light emission stage so that the cathode wire is reused as the initialization signal line, there is no need for separately setting cathode wires and separately setting initialization signal lines for sub-pixels of different colors in the display panel, the number of wires in the display panel can be reduced, and the complex wiring under independent cathode control of different sub-pixels in the display panel can be alleviated.

The display panel provided by the embodiment of the present application includes the display region and the non-display area at least partially surrounding the display region; the display region includes multiple sub-pixels, and the non-display region includes at least one reused signal line; the sub-pixel includes the pixel circuit and the light-emitting device; the pixel circuit includes the drive module, the initialization module, the data write module, and the storage module; the data write module is configured to transmit the data voltage to the drive module; the storage module is configured to store the data voltage of the control terminal of the drive module; the drive module is configured to generate the drive current according to the data voltage to drive the light-emitting device to emit light; the initialization module is configured to write the initialization voltage into the control terminal of the drive module and/or the anode of the light-emitting device; in each sub-pixel, the input terminal of the initialization module in the pixel circuit and the cathode of the light-emitting device are electrically connected to one reused signal line; and the reused signal line is configured to provide the initialization voltage for the initialization module in the initialization stage and provide the cathode voltage for the cathode of the light-emitting device in the light emission stage, thereby reducing the number of wires and the wiring difficulty of the display panel.

Figure 5:
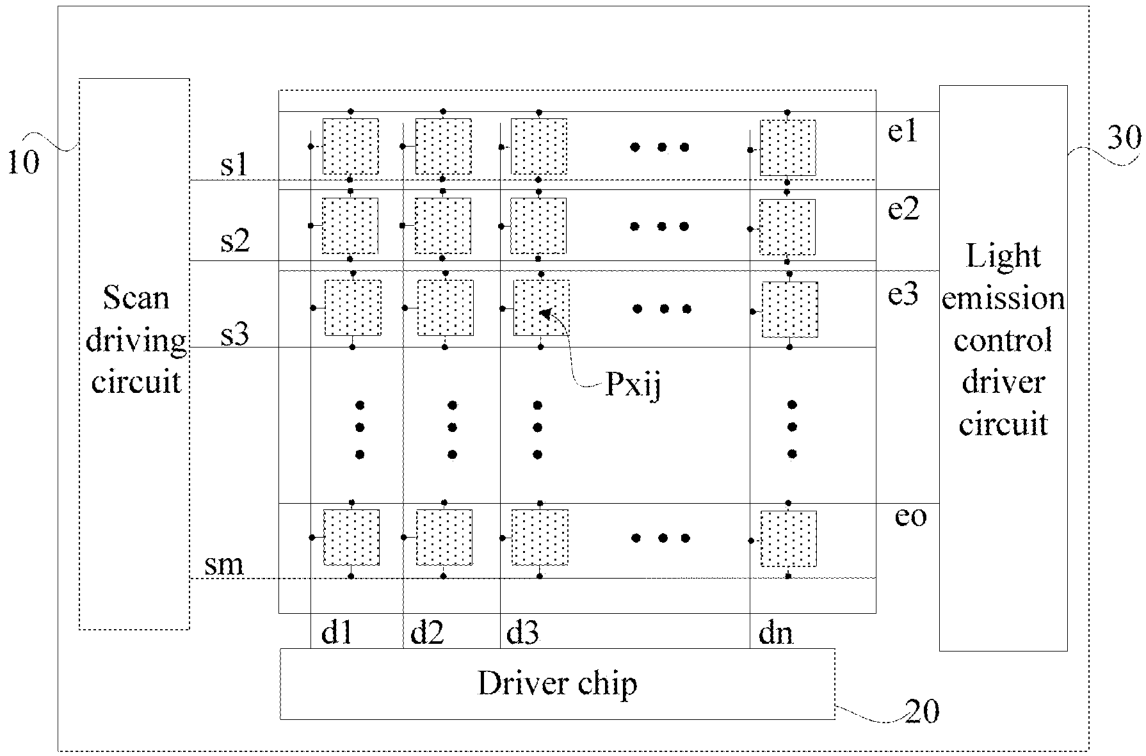
FIG. 5 is a structural diagram of another display panel according to an embodiment of the present application.
Figure 6:
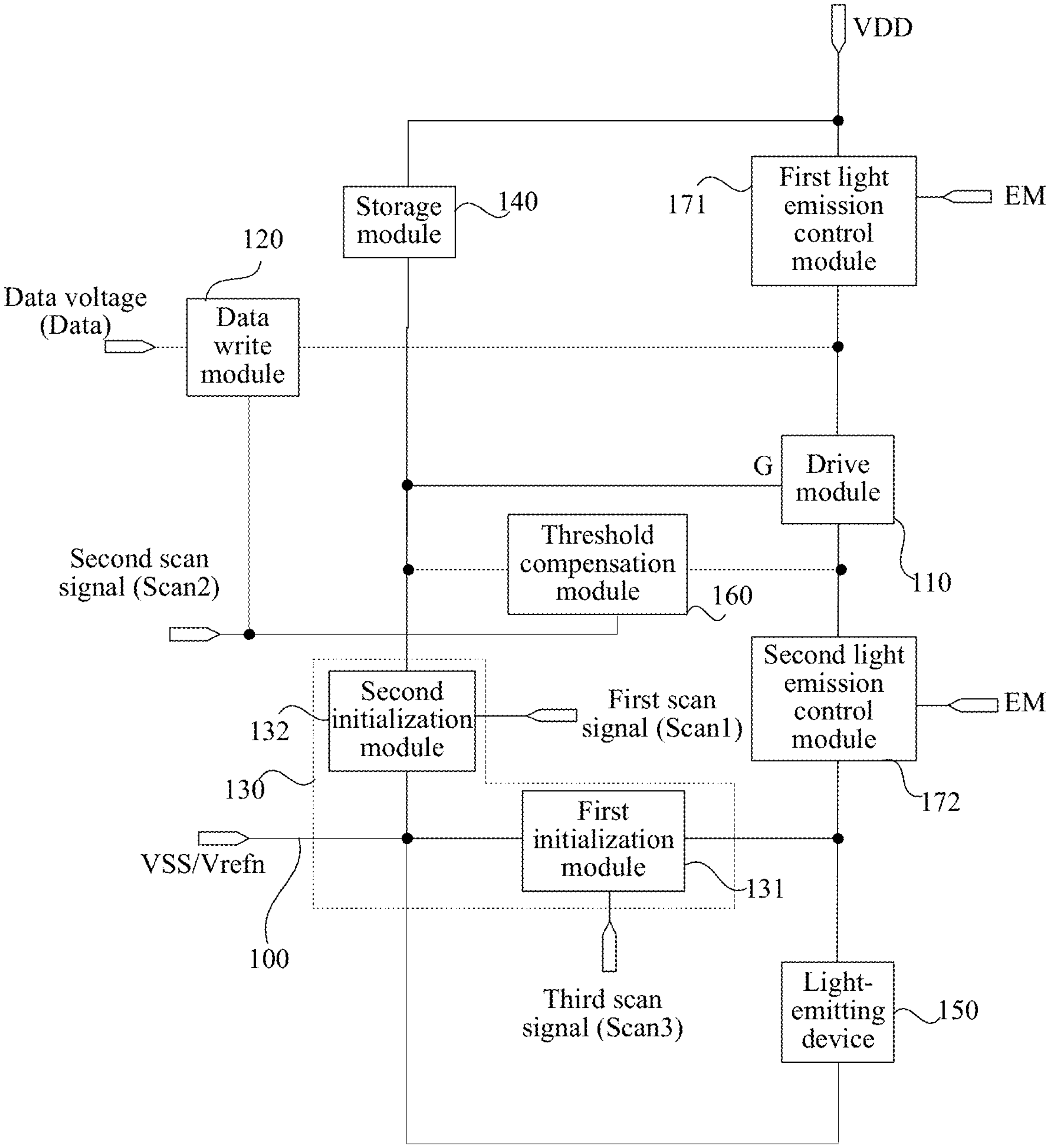
FIG. 6 is a structural diagram of another pixel circuit according to an embodiment of the present application.

In some embodiments of the present application, FIG. 5 is a structural diagram of another display panel according to an embodiment of the present application, and FIG. 6 is a structural diagram of another pixel circuit according to an embodiment of the present application. Referring to FIGS. 5 and 6, the non-display region 12 may further include a light emission control driver circuit 30. The driver circuit layer includes multiple light emission control signal lines (e1 to eo), and the light emission control driver circuit 30 is electrically connected to the multiple light emission control signal lines (e1 to eo) separately. The pixel circuit includes at least one light emission control module; and the at least one light emission control module, the drive module 110, and the light-emitting device 150 are electrically connected between the power signal line and the reused signal line 100. A light emission control signal EM on the light emission control signal line is used for controlling the on-state of the at least one light emission control module so that the drive module 110 can transmit the drive current to the light-emitting device 150 to drive the light-emitting device 150 to emit light. The pixel circuit further includes a threshold compensation module 160 electrically connected between a second terminal of the drive module 110 and the control terminal G of the drive module 110. The same scan signal is inputted into a control terminal of the threshold compensation module 160 and a control terminal of the data write module 120.

The at least one light emission control module may include a first light emission control module 171 and a second light emission control module 172. A first terminal of the first light emission control module 171 is electrically connected to the power signal line and configured to receive the power voltage VDD. A second terminal of the first light emission control module 171 is electrically connected to a first terminal of the drive module 110, and a second terminal of the drive module 110 is electrically connected to a first terminal of the second light emission control module 172; a second terminal of the second light emission control module 172 is electrically connected to the anode of the light-emitting device 150; and the light emission control signal line is electrically connected to a control terminal of the first light emission control module 171 and a control terminal of the second light emission control module 172. When the first light emission control module 171 and the second light emission control module 172 are both turned on, the power signal line and the anode of the light-emitting device 150 are conducting.

Figure 7:
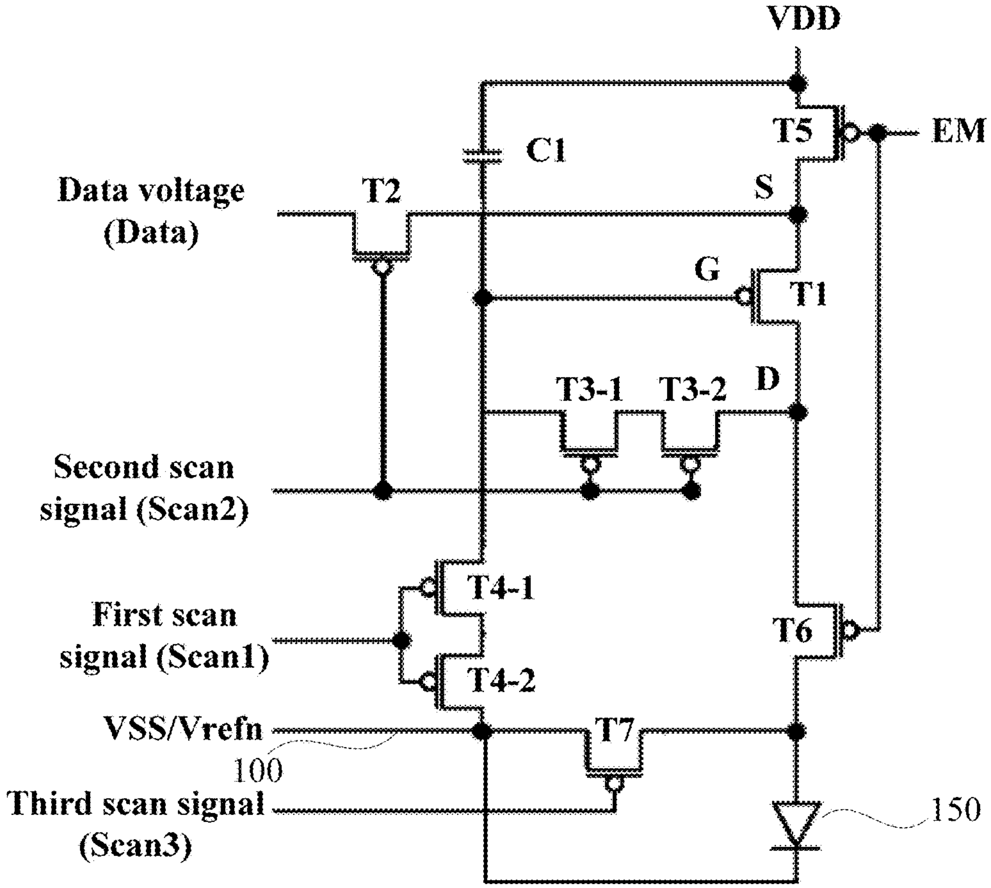
FIG. 7 is a structural diagram of another pixel circuit according to an embodiment of the present application.

FIG. 7 is a structural diagram of another pixel circuit according to an embodiment of the present application. Referring to FIG. 7, the drive module 110 includes a drive transistor T1, the data write module 120 includes a data write transistor T2, and the storage module 140 includes a storage capacitor C1. The at least one light emission control module includes a first light emission control transistor T5 and a second light emission control transistor T6. The threshold compensation module 160 includes a threshold compensation transistor, and the threshold compensation transistor is a double-gate transistor and includes a first threshold compensation transistor T3-1 and a second threshold compensation transistor T3-2.

In some embodiments of the present application, with continued reference to FIGS. 3 and 6, the initialization module 130 includes a first initialization module 131 and/or a second initialization module 132. A first terminal of the first initialization module 131 is electrically connected to the reused signal line 100, a second terminal of the first initialization module 131 is electrically connected to the anode of the light-emitting device 150, and a control terminal of the first initialization module 131 is configured to receive a first gate signal. A first terminal of the second initialization module 132 is electrically connected to the reused signal line 100, a second terminal of the second initialization module 132 is electrically connected to the control terminal G of the drive module 110, and a control terminal of the second initialization module 132 is configured to receive a second gate signal.

Figure 9:
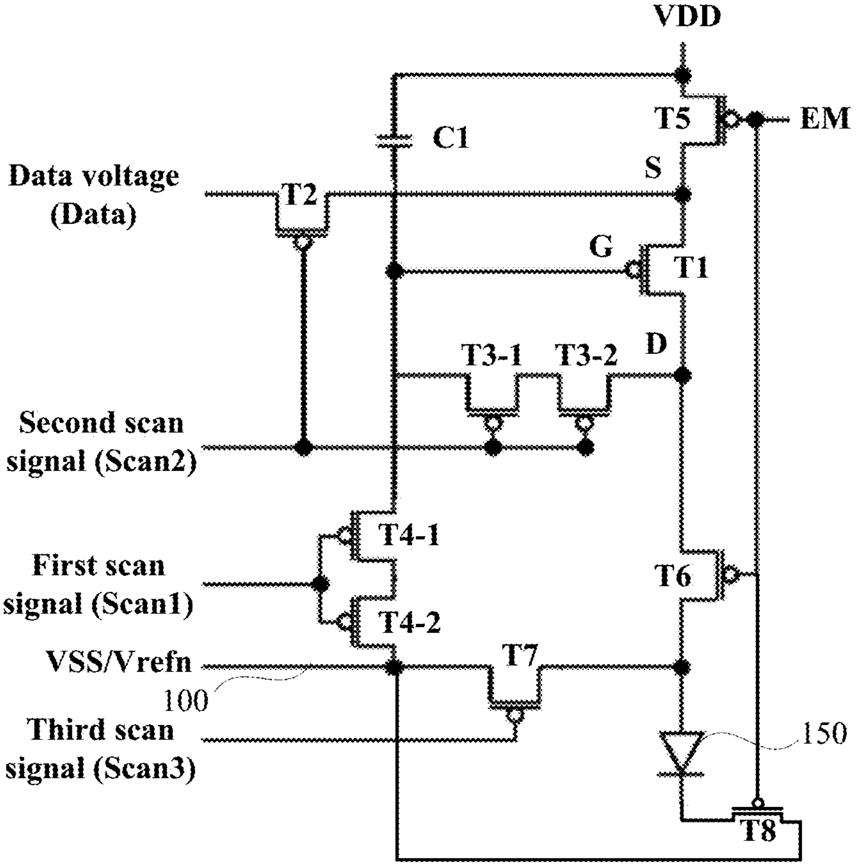
FIG. 9 is a structural diagram of another pixel circuit according to an embodiment of the present application.

The first initialization module 131 is configured to write the initialization voltage Vrefn into the anode of the light-emitting device 150. The second initialization module 132 is configured to write the initialization voltage Vrefn into the control terminal of the drive module 110. Referring to FIG. 7, the first initialization module 131 may include a first initialization transistor T7, a first electrode of the first initialization transistor T7 is electrically connected to the reused signal line 100, a second electrode of the first initialization transistor T7 is electrically connected to the anode of the light-emitting device 150, and a gate of the first initialization transistor T7 is configured to receive the first gate signal. Referring to FIG. 9, for example, when the anode of the light-emitting device 150 is reset, the light emission control signal EM is at a high level, and the first light emission control transistor T5, the second light emission control transistor T6, and a third light emission control transistor T8 are turned off; the first gate signal (the third scan signal Scan3) is at a low level, the first initialization transistor T7 is turned on, and the reused signal line 100 inputs the initialization voltage Vrefn to the anode of the light-emitting device 150 to reset the anode; when the light-emitting device 150 emits light, the light emission control signal EM is at a low level, the first gate signal (the third scan signal Scan3) is at a high level, the first initialization transistor T7 is turned off, the first light emission control transistor T5, the second light emission control transistor T6, and the third light emission control transistor T8 are turned on, and VSS is inputted into the reused signal line 100 to provide the cathode voltage VSS for the cathode of the light-emitting device 150.

The second initialization module 132 may include a second initialization transistor, and the second initialization transistor is a double-gate transistor and includes a first sub-transistor T4-2 and a second sub-transistor T4-1. A first electrode of the first sub-transistor T4-2 is electrically connected to the reused signal line 100, a second electrode of the first sub-transistor T4-2 is electrically connected to a first electrode of the second sub-transistor T4-1, and a second electrode of the second sub-transistor T4-1 is electrically connected to the control terminal G of the drive module 110. A gate of the first sub-transistor T4-2 and a gate of the second sub-transistor T4-1 receive the same second gate signal (the first scan signal Scan1). When the control terminal G of the drive transistor Tl is initialized, the light emission control signal EM is at a high level, the first light emission control transistor T5, the second light emission control transistor T6, and the third light emission control transistor T8 are turned off, the first scan signal Scan1 controls the first sub-transistor T4-2 and the second sub-transistor T4-1 to be turned on, and the initialization voltage Vrefn is inputted into the reused signal line 100 to initialize the control terminal G of the drive transistor T1.

The control terminal of the first initialization module 131 and the control terminal of the second initialization module 132 may be electrically connected to the same gate signal line as shown in FIG. 3 so that the first initialization module 131 and the second initialization module 132 can be turned on simultaneously, that is, the first gate signal is the same as the second gate signal. The control terminal of the first initialization module 131 and the control terminal of the second initialization module 132 may be electrically connected to different scan signal lines as shown in FIG. 6 so that the first initialization module 131 and the second initialization module 132 can be turned on at different time, that is, the first gate signal is different from the second gate signal.

In some embodiments of the present application, with continued reference to FIGS. 2 to 4, the multiple sub-pixels include at least one first sub-pixel, at least one second sub-pixel, and at least one third sub-pixel; multiple reused signal lines 100 include a first reused signal line a, a second reused signal line b, and a third reused signal line c; in the at least one first sub-pixel, the input terminal of the initialization module 130 in the pixel circuit and the cathode of the light-emitting device 150 are electrically connected to the first reused signal line a; in the at least one second sub-pixel, the input terminal of the initialization module 130 in the pixel circuit and the cathode of the light-emitting device 150 are electrically connected to the second reused signal line b; and in the at least one third sub-pixel, the input terminal of the initialization module 130 in the pixel circuit and the cathode of the light-emitting device 150 are electrically connected to the third reused signal line c.

The display panel includes different types of sub-pixels, and different types of sub-pixels may be understood as sub-pixels emitting light of different colors. The multiple reused signal lines 100 are provided in the non-display region 12. In each sub-pixel, the input terminal of the initialization module 130 in the pixel circuit and the cathode of the light-emitting device 150 are electrically connected to one reused signal line 100; and the reused signal line 100 is configured to provide the initialization voltage Vrefn for the initialization module 130 in the initialization stage and provide the cathode voltage VSS for the cathode of the light-emitting device 150 in the light emission stage.

The at least one first sub-pixel, the at least one second sub-pixel, and the at least one third sub-pixel emit light of different colors. For example, the at least one first sub-pixel is used for emitting red light, the at least one second sub-pixel is used for emitting green light, and the at least one third sub-pixel is used for emitting blue light. Correspondingly, the multiple reused signal lines include the first reused signal line a, the second reused signal line b, and the third reused signal line c. In the at least one first sub-pixel, the input terminal of the initialization module 130 in the pixel circuit and the cathode of the light-emitting device 150 are electrically connected to the first reused signal line a; and through the first reused signal line a, the initialization voltage Vrefn is provided for the initialization module 130 of the at least one first sub-pixel in the initialization stage and the cathode voltage VSS is provided for the cathode of the light-emitting device 150 in the light emission stage. In the at least one second sub-pixel, the input terminal of the initialization module 130 in the pixel circuit and the cathode of the light-emitting device 150 are electrically connected to the second reused signal line b; and through the second reused signal line b, the initialization voltage Vrefn is provided for the initialization module 130 of the at least one second sub-pixel in the initialization stage and the cathode voltage VSS is provided for the cathode of the light-emitting device 150 in the light emission stage. In the at least one third sub-pixel, the input terminal of the initialization module 130 in the pixel circuit and the cathode of the light-emitting device 150 are electrically connected to the third reused signal line c; and through the third reused signal line c, the initialization voltage Vrefn is provided for the initialization module 130 of the at least one third sub-pixel in the initialization stage and the cathode voltage VSS is provided for the cathode of the light-emitting device 150 in the light emission stage. The first reused signal line a, the second reused signal line b, and the third reused signal line c are provided so that the cathode voltage VSS of the at least one first sub-pixel, the cathode voltage VSS of the at least one second sub-pixel, and the cathode voltage VSS of the at least one third sub-pixel can be controlled independently, and the initialization voltage Vrefn of the at least one first sub-pixel, the initialization voltage Vrefn of the at least one second sub-pixel, and the initialization voltage Vrefn of the at least one third sub-pixel can be controlled independently.

The non-display region 12 may be provided with one first reused signal line a, one second reused signal line b, and one third reused signal line c. All the first sub-pixels are electrically connected to the same first reused signal line a, all the second sub-pixels are electrically connected to the same second reused signal line b, and all the third sub-pixels are electrically connected to the same third reused signal line c, thereby further reducing the number of wires in the non-display region 12 of the display panel, which is conducive to the development of a narrow bezel of the display panel.

Alternatively, the non-display region 12 may be provided with at least two first reused signal lines a, at least two second reused signal lines b, and at least two third reused signal lines c. Each first reused signal line a is electrically connected to part of the first sub-pixels so that the partition control of the first sub-pixels in the display panel can be achieved. Each second reused signal line b is electrically connected to part of the second sub-pixels so that the partition control of the second sub-pixels in the display panel can be achieved. Each third reused signal line c is electrically connected to part of the third sub-pixels so that the partition control of the third sub-pixels in the display panel can be achieved.

In some embodiments, at least one reused signal line includes multiple reused signal lines 100, and the multiple reused signal lines 100 provide different cathode voltages VSS for the cathodes of the light-emitting devices 150 in the multiple sub-pixels, respectively.

For example, different cathode voltages VSS and different initialization voltages Vrefn may be provided for the sub-pixels emitting light of different colors as required, thereby reducing the power consumption of the display panel and alleviating the high power consumption caused by using the same cathode voltage on the entire display panel. Moreover, the reused signal line 100 is used to replace the cathode wire and the initialization signal line so that the cathode wire is reused as the initialization signal line, the number of wires in the display panel can be reduced, and the complex wiring under independent cathode control of different sub-pixels in the display panel can be alleviated.

Figure 8:
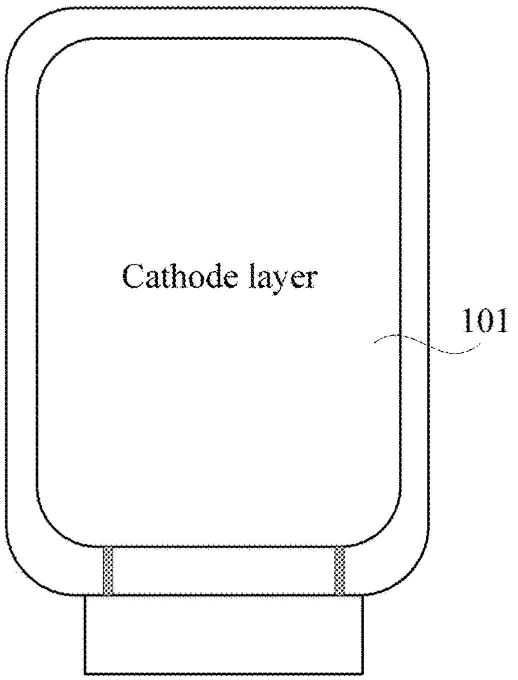
FIG. 8 is a structural diagram of a cathode layer in a display panel according to an embodiment.

In addition, FIG. 8 is a structural diagram of a cathode layer in a display panel according to an embodiment. Referring to FIG. 8, the cathode in the OLED display panel is a common cathode, the sub-pixels in the entire surface use the same cathode layer 101, and the cathode voltages of the sub-pixels are all the same. However, sub-pixels of different colors may require different cathode voltages. Therefore, using the same cathode voltage may result in sacrificing part of the power consumption. In addition, the common cathode may cause the sub-pixels in the entire surface to use the same initialization voltage, and the sub-pixels of different colors may require different initialization voltages. Therefore, using the same initialization voltage may also result in sacrificing part of the power consumption.

In the embodiment of the present application, in each sub-pixel, the input terminal of the initialization module 130 in the pixel circuit and the cathode of the light-emitting device 150 are electrically connected to one reused signal line 100; and different sub-pixels are electrically connected to different reused signal lines 100. The reused signal line 100 is used to provide the initialization voltage Vrefn for the initialization module 130 in the initialization stage and provide the cathode voltage VSS for the cathode of the light-emitting device 150 in the light emission stage so that the initialization voltages Vrefn of the sub-pixels emitting light of different colors can be controlled independently, and the cathode voltages VSS of the sub-pixels emitting light of different colors can be controlled independently. In this manner, different cathode voltages VSS and different initialization voltages Vrefn can be provided for the sub-pixels emitting light of different colors according to requirements, thereby reducing the power consumption of the display panel and alleviating the high power consumption caused by using the same cathode voltage on the entire display panel. Moreover, the reused signal line 100 is used to replace the cathode wire and the initialization signal line so that the cathode wire is reused as the initialization signal line, there is no need for separately setting cathode wires and separately setting initialization signal lines for the sub-pixels of different colors in the display panel, the high power consumption caused by different sub-pixels using the same cathode voltage VSS and the same initialization voltage Vrefn can be solved, the number of wires in the display panel can be reduced, and the complex wiring under independent cathode control of different sub-pixels in the display panel can be alleviated.

In some embodiments of the present application, referring to FIG. 4, the multiple reused signal lines 100 are electrically connected to different output terminals of the driver chip 20, respectively. It is to be understood that the respective initialization voltages Vrefn and cathode voltages VSS on the first reused signal line a, the second reused signal line b, and the third reused signal line c are provided by the driver chip 20. The driver chip 20 may provide the initialization voltage Vrefn required by the at least one first sub-pixel for the first reused signal line a in the initialization stage of the at least one first sub-pixel and provide the cathode voltage VSS required by the at least one first sub-pixel for the first reused signal line a in the light emission stage of the at least one first sub-pixel; the driver chip 20 may provide the initialization voltage Vrefn required by the at least one second sub-pixel for the second reused signal line b in the initialization stage of the at least one second sub-pixel and provide the cathode voltage VSS required by the at least one second sub-pixel for the second reused signal line b in the light emission stage of the at least one second sub-pixel; and the driver chip 20 may provide the initialization voltage Vrefn required by the at least one third sub-pixel for the third reused signal line c in the initialization stage of the at least one third sub-pixel and provide the cathode voltage VSS required by the at least one third sub-pixel for the at least one third reused signal line c in the light emission stage of the at least one third sub-pixel.

In some embodiments of the present application, the at least one light emission control module is configured to control conduction between the light-emitting device 150 and the power signal line and control conduction between the light-emitting device 150 and the reused signal line 100 in the light emission stage. It is to be understood that, on the basis of controlling the conduction state between the light-emitting device 150 and the power signal line, the at least one light emission control module may also control the conduction state between the light-emitting device 150 and the reused signal line 100. The at least one light emission control module controls the conduction state between the cathode of the light-emitting device 150 and the reused signal line 100 so that when the initialization module 130 provides the initialization voltage Vrefn for the anode of the light-emitting device 150, the at least one light emission control module can control the cathode of the light-emitting device 150 to be disconnected from the reused signal line 100, thereby avoiding the case that due to the transistor leakage in the pixel circuit, the light-emitting device 150 emits light in the non-light emission stage, affecting the display effect of the display panel.

FIG. 9 is a structural diagram of another pixel circuit according to an embodiment of the present application. Referring to FIG. 9, the at least one light emission control module includes the first light emission control transistor T5, the second light emission control transistor T6, and the third light emission control transistor T8. A first electrode of the first light emission control transistor T5 is electrically connected to the power signal line, a second electrode of the first light emission control transistor T5 is electrically connected to the first terminal of the drive module 110 (the drive transistor T1), the second terminal of the drive module 110 is electrically connected to a first electrode of the second light emission control transistor T6, and a second electrode of the second light emission control transistor T6 is electrically connected to the anode of the light-emitting device 150. A first electrode of the third light emission control transistor T8 is electrically connected to the cathode of the light-emitting device 150, and a second electrode of the third light emission control transistor T8 is electrically connected to the reused signal line 100; and a gate of the first light emission control transistor T5, a gate of the second light emission control transistor T6, and a gate of the third light emission control transistor T8 are all electrically connected to the light emission control signal line so that the light emission control signal EM on the light emission control signal line can simultaneously control the first light emission control transistor T5, the second light emission control transistor T6, and the third light emission control transistor T8 to be turned on or off.

In some embodiments of the present application, cathodes of light-emitting devices 150 in part of the sub-pixels are electrically connected, and the light-emitting devices 150 in the part of the sub-pixels emit light of the same color. It is to be understood that the cathodes of part of the light-emitting devices 150 in the display panel are electrically connected, and the part of the light-emitting devices 150 emit light of the same color so that cathodes of at least part of the light-emitting devices 150 emitting light of the same color receive the same cathode voltage VSS, and one reused signal line 100 may provide the cathode voltage VSS for at least the part of the light-emitting devices 150 emitting light of the same color. In some embodiments, cathodes of part of the light-emitting devices 150 are integrally connected to form at least one cathode bar; or cathodes of part of the light-emitting devices 150 are electrically connected through a connection wire. For example, the cathodes of part of the light-emitting devices 150 are integrally connected to form the at least one cathode bar so that the reused signal line 100 is electrically connected to the at least one cathode bar, that is, the cathode voltage VSS may be provided through the at least one cathode bar for at least the part of the light-emitting devices 150 emitting light of the same color. Alternatively, the cathode of the light-emitting device 150 is a separate cathode, and the cathodes of part of the light-emitting devices 150 are electrically connected through the connection wire so that after the reused signal line 100 is electrically connected to the connection wire or the cathode of one of the light-emitting devices 150, the cathode voltage VSS on the reused signal line 100 may be transmitted through the connection wire between the cathodes of part of the light-emitting devices 150 to the cathodes of at least the part of the light-emitting devices 150 emitting light of the same color.

In some embodiments of the present application, the at least one cathode bar may include multiple first cathode bars, multiple second cathode bars, and multiple third cathode bars; the sub-pixels are arranged in an array; all the first sub-pixels emit light of the same color, all the second sub-pixels emit light of the same color, and all the third sub-pixels emit light of the same color. Cathodes of light-emitting devices 150 in first sub-pixels in the same column are integrally connected to form the first cathode bar, and each first cathode bar is electrically connected to the first reused signal line a in the non-display region 12 of the display panel; cathodes of light-emitting devices 150 in second sub-pixels in the same column are integrally connected to form the second cathode bar, and each second cathode bar is electrically connected to the second reused signal line b in the non-display region 12 of the display panel; and cathodes of light-emitting devices 150 in third sub-pixels in the same column are integrally connected to form the third cathode bar, and each third cathode bar is electrically connected to the third reused signal line c in the non-display region 12 of the display panel.

The light-emitting devices 150 in the first sub-pixels in the same column share the same first cathode bar for electrical connection, and each first cathode bar is electrically connected to the first reused signal line a in the non-display region 12 of the display panel so that the cathode voltage VSS on the first reused signal line a is provided through the first cathode bar for the cathodes of the light-emitting devices 150 of the first sub-pixels on the entire surface. The light-emitting devices 150 in the second sub-pixels in the same column share the same second cathode bar for electrical connection, and each second cathode bar is electrically connected to the second reused signal line b in the non-display region 12 of the display panel so that the cathode voltage VSS on the second reused signal line b is provided through the second cathode bar for the cathodes of the light-emitting devices 150 of the second sub-pixels on the entire surface. The light-emitting devices 150 in the third sub-pixels in the same column share the same third cathode bar for electrical connection, and each third cathode bar is electrically connected to the third reused signal line c in the non-display region 12 of the display panel so that the cathode voltage VSS on the third reused signal line c is provided through the third cathode bar for the cathodes of the light-emitting devices 150 of the third sub-pixels on the entire surface.

In some embodiments, for each sub-pixel, the input terminal of the initialization module 130 is electrically connected to the cathode of the light-emitting device 150 through a via, or the input terminal of the initialization module 130 and the light-emitting device 150 are electrically connected to the same cathode bar.

The display panel includes the substrate, a driver circuit layer disposed on the substrate, and the light-emitting structure layer disposed on a side of the driver circuit layer facing away from the substrate. The light-emitting structure layer includes multiple light-emitting devices 150. Each light-emitting device 150 includes the anode disposed on the driver circuit layer, a light-emitting material layer located on a side of the anode facing away from the substrate, and the cathode located on a side of the light-emitting material layer facing away from the substrate. When cathodes of part of the light-emitting devices 150 are electrically connected through the connection wire, the first terminal of the initialization module 130 in each sub-pixel may be electrically connected to the cathode of the light-emitting device 150 through the via. When the cathode of the light-emitting device 150 receives the initialization voltage Vrefn transmitted by the reused signal line 100, the initialization voltage Vrefn may be transmitted to the input terminal of the initialization module 130 through the cathode of the light-emitting device 150 and the via. Alternatively, when the cathodes of part of the light-emitting devices 150 are integrally connected to form the at least one cathode bar, the input terminal of the initialization module 130 and the light-emitting device 150 in each sub-pixel may be electrically connected to the same cathode bar, and the input terminal of the initialization module 130 may directly receive the initialization voltage Vrefn on the at least one cathode bar.

In another embodiment of the present application, the display panel may further include multiple signal transmission lines located in the display region 11, each signal transmission line is electrically connected to cathodes of light-emitting devices 150 in sub-pixels of one row or one column, each signal transmission line is electrically connected to one reused signal line 100, and the reused signal line 100 transmits the cathode voltage VSS to the cathode of the light-emitting device 150 through each signal transmission line.

The signal transmission line may be, for example, the initialization signal line. The initialization signal line is connected to the reused signal line 100 located in the non-display region 12 so that the initialization voltage Vrefn on the reused signal line 100 can be transmitted to the initialization module 130 in the pixel circuit in the initialization stage. The input terminal of the initialization module 130 is electrically connected to the cathode of the light-emitting device 150 through the via so that each initialization signal line is electrically connected to the cathodes of the light-emitting devices 150 in the sub-pixels of one row or one column, and the cathode voltage VSS on the reused signal line 100 can be transmitted to the cathodes of the light-emitting devices 150 through the initialization signal line in the light emission stage.

Figure 10:
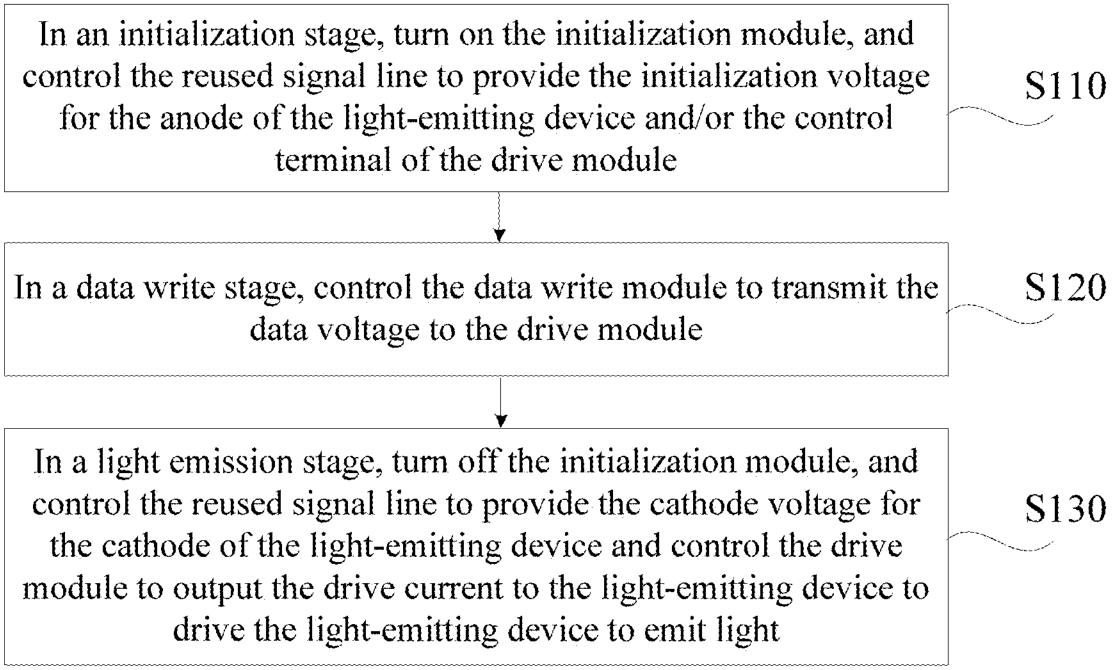
FIG. 10 is a flowchart of a driving method for a display panel according to an embodiment of the present application.

An embodiment of the present application further provides a driving method for a display panel for driving the display panel described in any of the preceding embodiments. FIG. 10 is a flowchart of a driving method for a display panel according to an embodiment of the present application. Referring to FIG. 10, in conjunction with FIG. 3, the driving method for a display panel includes the steps described below.

In S110, in an initialization stage, the initialization module is turned on, and the reused signal line is controlled to provide the initialization voltage for the anode of the light-emitting device and/or the control terminal of the drive module.

In the initialization stage, the scan signal on the scan signal line turns on the initialization module 130, and the reused signal line 100 is controlled to provide the initialization voltage Vrefn for the anode of the light-emitting device 150 and/or the control terminal G of the drive module 110. The initialization module 130 may include the first initialization module 131 and/or the second initialization module 132. The first terminal of the first initialization module 131 is electrically connected to the reused signal line 100, the second terminal of the first initialization module 131 is electrically connected to the anode of the light-emitting device 150, and the control terminal of the first initialization module 131 is configured to receive the first gate signal; and the first terminal of the second initialization module 132 is electrically connected to the reused signal line 100, the second terminal of the second initialization module 132 is electrically connected to the control terminal G of the drive module 110, and the control terminal of the second initialization module 132 is configured to receive the second gate signal. The control terminal of the first initialization module 131 and the control terminal of the second initialization module 132 may be electrically connected to the same scan signal line so that the first initialization module 131 and the second initialization module 132 can be turned on simultaneously. The control terminal of the first initialization module 131 and the control terminal of the second initialization module 132 may be electrically connected to different scan signal lines so that the first initialization module 131 and the second initialization module 132 can be turned on at different time. In some embodiments of the present application, referring to FIG. 3, the first scan signal Scan 1 is inputted into both the control terminal of the first initialization module 131 and the control terminal of the second initialization module 132 so that the first initialization module 131 and the second initialization module 132 are turned on simultaneously.

In S120, in a data write stage, the data write module is controlled to transmit the data voltage to the drive module.

In the data write stage, the initialization module 130 is turned off through the first scan signal Scan1 on the first scan signal line. The data write module 120 is controlled to be turned on through the second scan signal Scan2 on the second scan signal line, and the data write module 120 may write the data voltage Data on the data signal line into the control terminal G of the drive module 110. The storage module 140 is electrically connected to the control terminal G of the drive module 110 and may store the voltage of the control terminal G of the drive module 110.

In S130, in a light emission stage, the initialization module is turned off, the reused signal line is controlled to provide the cathode voltage for the cathode of the light-emitting device, and the drive module is controlled to output the drive current to the light-emitting device to drive the light-emitting device to emit light.

In the light emission stage, the initialization module 130 is turned off through the first scan signal Scan1 on the first scan signal line. The data write module 120 is turned off through the second scan signal Scan2 on the second scan signal line. The reused signal line 100 is controlled to provide the cathode voltage VSS for the cathode of the light-emitting device 150, and the drive module 110 is controlled to output the drive current to the light-emitting device 150. For each type of sub-pixels, the input terminals of the initialization modules 130 in the pixel circuits and the cathodes of the light-emitting devices 150 are electrically connected to one reused signal line 100; and the reused signal line 100 is used to provide the initialization voltage Vrefn for the initialization modules 130 in the initialization stage and provide the cathode voltage VSS for the cathodes of the light-emitting devices 150 in the light emission stage so that the cathode voltages VSS and the initialization voltages Vrefn of the sub-pixels emitting light of different colors can be controlled independently. In this manner, different cathode voltages VSS and different initialization voltages Vrefn can be provided for the sub-pixels emitting light of different colors as required, thereby reducing the power consumption of the display panel and alleviating the high power consumption caused by using the same cathode voltage on the entire display panel. Moreover, the reused signal line 100 is used to replace the cathode wire and the initialization signal line so that the cathode wire is reused as the initialization signal line, and there is no need for separately setting cathode wires and separately setting initialization signal lines for the sub-pixels of different colors in the display panel. Moreover, different cathode voltages and initialization voltages are transmitted to different partitions so that the high power consumption caused by using the same cathode voltage and the same initialization voltage can be solved, the number of wires in the display panel can be reduced, and the complex wiring under independent cathode control of different sub-pixels in the display panel can be alleviated.

Figure 11:
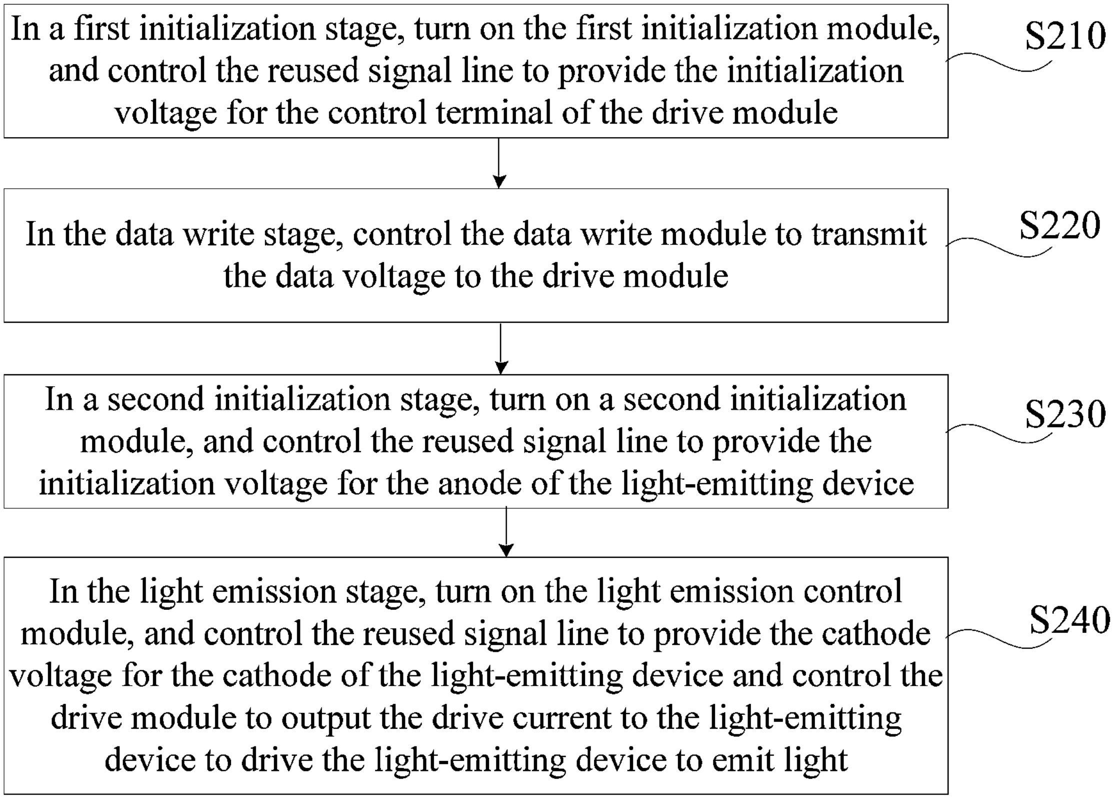
FIG. 11 is a flowchart of another driving method for a display panel according to an embodiment of the present application.

FIG. 11 is a flowchart of another driving method for a display panel according to an embodiment of the present application. Referring to FIG. 11, in conjunction with FIG. 9, the driving method for a display panel includes the steps described below.

In S210, in a first initialization stage, the first initialization module is turned on, and the reused signal line is controlled to provide the initialization voltage for the control terminal of the drive module.

In S220, in the data write stage, the data write module is controlled to transmit the data voltage to the drive module.

In S230, in a second initialization stage, the second initialization module is turned on, and the reused signal line is controlled to provide the initialization voltage for the anode of the light-emitting device.

In S240, in the light emission stage, the at least one light emission control module is turned on, the reused signal line is controlled to provide the cathode voltage for the cathode of the light-emitting device, and the drive module is controlled to output the drive current to the light-emitting device to drive the light-emitting device to emit light.

The pixel circuit of the sub-pixel further includes the at least one light emission control module, the at least one light emission control module, the drive module 110, and the light-emitting device 150 are electrically connected between the power signal line and the reused signal line 100, and the at least one light emission control module is configured to control the conduction state between the light-emitting device 150 and the power signal line and control the conduction state between the light-emitting device 150 and the reused signal line 100. The step in which the reused signal line 100 is controlled to provide the cathode voltage VSS for the cathode of the light-emitting device 150 and the drive module 110 is controlled to output the drive current to the light-emitting device 150 includes the following: the at least one light emission control module is controlled to be turned on so that the reused signal line 100 and the cathode of the light-emitting device 150 are conducting, and thus the reused signal line 100 transmits the cathode voltage VSS to the cathode of the light-emitting device 150; and the at least one light emission control module is controlled to be turned on so that the power signal line is electrically connected to the drive module 110, the drive module 110 is electrically connected to the anode of the light-emitting device 150, and thus the drive module 110 outputs the drive current to the light-emitting device 150.

Referring to FIG. 9, the at least one light emission control module may include the first light emission control transistor T5, the second light emission control transistor T6, and the third light emission control transistor T8. The first electrode of the first light emission control transistor T5 is electrically connected to the power signal line, the second electrode of the first light emission control transistor T5 is electrically connected to the first terminal of the drive module 110 (the drive transistor T1), the second terminal of the drive module 110 is electrically connected to the first electrode of the second light emission control transistor T6, and the second electrode of the second light emission control transistor T6 is electrically connected to the anode of the light-emitting device 150. The first electrode of the third light emission control transistor T8 is electrically connected to the cathode of the light-emitting device 150, and the second electrode of the third light emission control transistor T8 is electrically connected to the reused signal line 100; and the gate of the first light emission control transistor T5, the gate of the second light emission control transistor T6, and the gate of the third light emission control transistor T8 are all electrically connected to the light emission control signal line so that the light emission control signal EM on the light emission control signal line can simultaneously control the first light emission control transistor T5, the second light emission control transistor T6, and the third light emission control transistor T8 to be turned on or off. The third light emission control transistor T8 is used to control the cathode of the light-emitting device 150 to be disconnected from the reused signal line 100, thereby avoiding the case where the light-emitting device 150 emits light in the non-light emission stage due to the transistor leakage in the pixel circuit, affecting the display effect of the display panel.

Figure 12:
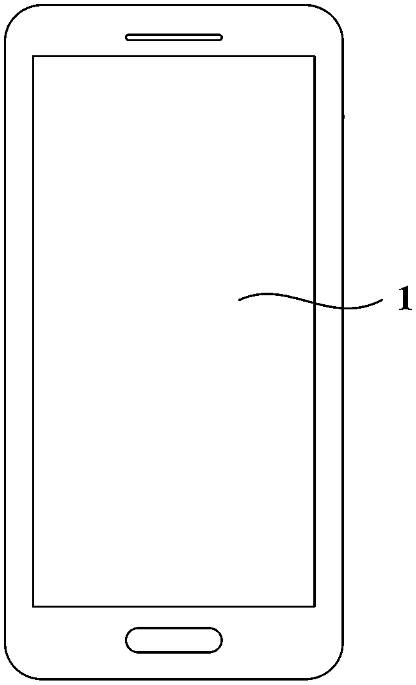
FIG. 12 is a structural diagram of a display device according to an embodiment of the present application.

FIG. 12 is a structural diagram of a display device according to an embodiment of the present application. Referring to FIG. 12, the embodiment of the present application further provides a display device that includes a display panel 1 described in any of the preceding embodiments and has the same technical effects. The details are not repeated here.

What is claimed is:

1. A display panel, comprising:
- a display region;
- a non-display region at least partially surrounding the display region;
- a plurality of sub-pixels, wherein the plurality of sub-pixels is located in the display region, each sub-pixel of the plurality of sub-pixels comprises a pixel circuit and a light-emitting device, and each pixel circuit comprises:
  - a drive module configured to generate a drive current according to a voltage of a control terminal of the drive module to drive the light-emitting device to emit light;
  - an initialization module configured to simultaneously write an initialization voltage into both the control terminal of the drive module and an anode of the light-emitting device;
  - a data write module configured to transmit a data voltage to the drive module; and
  - a storage module configured to store the voltage of the control terminal of the drive module; and
- at least one reused signal line; and,
- for each sub-pixel of the plurality of sub-pixels, an input terminal of the initialization module in the pixel circuit and a cathode of the light-emitting device are electrically connected to one reused signal line of the at least one reused signal line; and each reused signal line of the at least one reused signal line is configured to;
- in an initialization stage, provide the initialization voltage for the initialization module connected to the respective reused signal line; and
- in a light emission stage, provide a cathode voltage for the cathode of the light-emitting device connected to the respective reused signal line, wherein the pixel circuit of each sub-pixel of the plurality of sub-pixels further comprises at least one light emission control module, the at least one light emission control module further comprises a first light emission control transistor, a second light emission control transistor, and a third light emission control transistor, a first electrode of the third light emission control transistor is connected to the cathode of the light-emitting device, a second electrode of the third light emission control transistor is connected to the at least one reused signal line, and a gate of the third light emission control transistor is connected to a light emission control signal line.

2. The display panel of claim 1, wherein the plurality of sub-pixels further comprises:
- at least one first sub-pixel,
- at least one second sub-pixel, and
- at least one third sub-pixel; and the at least one reused signal line further comprises:
- a first reused signal line,
- a second reused signal line, and
- a third reused signal line; wherein,
- in the at least one first sub-pixel, the input terminal of the initialization module in the pixel circuit and the cathode of the light-emitting device are electrically connected to the first reused signal line;
- in the at least one second sub-pixel, the input terminal of the initialization module in the pixel circuit and the cathode of the light-emitting device are electrically connected to the second reused signal line; and
- in the at least one third sub-pixel, the input terminal of the initialization module in the pixel circuit and the cathode of the light-emitting device are electrically connected to the third reused signal line.

3. The display panel of claim 1, wherein the at least one reused signal line further comprises:
- a plurality of reused signal lines configured to respectively provide different cathode voltages for cathodes of light-emitting devices of different types of sub-pixels among the plurality of sub-pixels.

4. The display panel of claim 1, wherein the at least one reused signal line further comprises:
- a plurality of reused signal lines configured to be respectively connected to different output terminals of a driver chip.

5. The display panel of claim 1, wherein the at least one reused signal line further comprises:
- a plurality of reused signal lines configured to respectively transmit different initialization voltages to input terminals of initialization modules of different types of sub-pixels among the plurality of sub-pixels.

6. The display panel of claim 1, wherein the at least one light emission control module, the drive module, and the light-emitting device are connected between a power signal line and the at least one reused signal line, and the at least one light emission control module is configured to;
- in the light emission stage, control conduction between the light-emitting device and the power signal line and control conduction between the light-emitting device and the at least one reused signal line connected to the light-emitting device.

7. The display panel of claim 6, wherein a first electrode of the first light emission control transistor is connected to the power signal line, a second electrode of the first light emission control transistor is connected to a first terminal of the drive module, a second terminal of the drive module is connected to a first electrode of the second light emission control transistor, a second electrode of the second light emission control transistor is connected to the anode of the light-emitting device, and a gate of the first light emission control transistor and a gate of the second light emission control transistor are both connected to the light emission control signal line.

8. The display panel of claim 1, wherein the initialization module further comprises:
- at least one of a first initialization module and a second initialization module; wherein a first terminal of the first initialization module is electrically connected to the at least one reused signal line, a second terminal of the first initialization module is electrically connected to the anode of the light-emitting device, and a control terminal of the first initialization module is configured to receive a first gate signal; and a first terminal of the second initialization module is electrically connected to the at least one reused signal line, a second terminal of the second initialization module is electrically connected to the control terminal of the drive module, and a control terminal of the second initialization module is configured to receive a second gate signal.

9. The display panel of claim 2, wherein cathodes of light-emitting devices of part of the plurality of sub-pixels are electrically connected, and the light-emitting devices are configured to emit light of a same color.

10. The display panel of claim 2, wherein cathodes of light-emitting devices of part of the plurality of sub-pixels are integrally connected to form at least one cathode bar; or the cathodes of the light-emitting devices of the part of the plurality of sub-pixels are electrically connected through a connection wire.

11. The display panel of claim 9, further comprising:

a plurality of first cathode bars, a plurality of second cathode bars, and a plurality of third cathode bars, wherein the plurality of sub-pixels are arranged in an array; and in the plurality of sub-pixels, the at least one first sub-pixel emits light of a same color, the at least one second sub-pixel emits light of a same color, and the at least one third sub-pixel emits light of a same color;

cathodes of light-emitting devices in first sub-pixels in a same column are integrally connected to form one first cathode bar of the plurality of first cathode bars, and each first cathode bar of the plurality of first cathode bars is electrically connected to the first reused signal line in the non-display region of the display panel;

cathodes of light-emitting devices in second sub-pixels in a same column are integrally connected to form one second cathode bar of the plurality of second cathode bars, and each second cathode bar of the plurality of second cathode bars is electrically connected to the second reused signal line in the non-display region of the display panel; and cathodes of light-emitting devices in third sub-pixels in a same column are integrally connected to form one third cathode bar of the plurality of third cathode bars, and each third cathode bar of the plurality of third cathode bars is electrically connected to the third reused signal line in the non-display region of the display panel.

12. The display panel of claim 10, wherein, in each sub-pixel of the plurality of sub-pixels, a first terminal of the initialization module is electrically connected to the cathode of the light-emitting device through a via, or in each sub-pixel of the plurality of sub-pixels, the first terminal of the initialization module and the light-emitting device are electrically connected to a same one of the at least one cathode bar.

13. The display panel of claim 1, further comprising:

a plurality of signal transmission lines located in the display region, wherein each signal transmission line of the plurality of signal transmission lines is electrically connected to cathodes of light-emitting devices in sub-pixels of one row or one column among the plurality of sub-pixels and electrically connected to one of the at least one reused signal line, and the at least one reused signal line is configured to transmit the cathode voltage to the cathode of the light-emitting device through each signal transmission line of the plurality of signal transmission lines.

14. A driving method for a display panel, wherein the display panel comprises:

a display region, a non-display region at least partially surrounding the display region, a plurality of sub-pixels, wherein the plurality of sub-pixels is located in the display region, each sub-pixel of the plurality of sub-pixels comprises a pixel circuit and a light-emitting device, and each pixel circuit comprises:

a drive module configured to generate a drive current according to a voltage of a control terminal of the drive module to drive the light-emitting device to emit light;

an initialization module configured to simultaneously write an initialization voltage into both the control terminal of the drive module and an anode of the light-emitting device;

a data write module configured to transmit a data voltage to the drive module; and a storage module configured to store the voltage of the control terminal of the drive module; and at least one reused signal line; and, for each sub-pixels of the plurality of sub-pixels, an input terminal of the initialization module in the pixel circuit and a cathode of the light-emitting device are electrically connected to one reused signal line of the at least one reused signal line; and the driving method comprises:

in an initialization stage, provide the initialization voltage for the initialization module connected to the respective reused signal line, turn on the initialization module, and control the one reused signal line to provide the initialization voltage for at least one of the anode of the light-emitting device and the control terminal of the drive module; and in a light emission stage, provide a cathode voltage for the cathode of the light-emitting device connected to the respective reused signal line, turn off the initialization module, control the one reused signal line to provide the cathode voltage for the cathode of the light-emitting device, and control the drive module to output the drive current to the light-emitting device to drive the light-emitting device to emit the light; and in a data write stage, control the data write module to transmit the data voltage to the drive module, wherein the pixel circuit of each sub-pixel of the plurality of sub-pixels further comprises at least one light emission control module, the at least one light emission control module further comprises a first light emission control transistor, a second light emission control transistor, and a third light emission control transistor, a first electrode of the third light emission control transistor is connected to the cathode of the light-emitting device, a second electrode of the third light emission control transistor is connected to the at least one reused signal line, and a gate of the third light emission control transistor is connected to a light emission control signal line.

15. The driving method of claim 14, wherein controlling the at least one reused signal line to provide the cathode voltage for the cathode of the light-emitting device and controlling the drive module to output the drive current to the light-emitting device to drive the light-emitting device to emit light further comprises:

controlling at least one light emission control module in the pixel circuit to be turned on to electrically connect the at least one reused signal line to the cathode of the light-emitting device, such that the cathode voltage is transmitted to the cathode of the light-emitting device through the at least one reused signal line; and controlling the at least one light emission control module to be turned on to electrically connect a power signal line to the drive module and electrically connect the drive module to the anode of the light-emitting device, such that the drive current is output to the light-emitting device through the drive module,; wherein the at least one light emission control module, the drive module, and the light-emitting device are connected between the power signal line and the at least one reused signal line.

16. A display device, comprising a display panel, wherein the display panel comprises:

a display region, a non-display region at least partially surrounding the display region, a plurality of sub-pixels, wherein the plurality of sub-pixels is located in the display region, each sub-pixel of the plurality of sub-pixels comprises a pixel circuit and a light-emitting device, and each pixel circuit comprises:

a drive module configured to generate a drive current according to a voltage of a control terminal of the drive module to drive the light-emitting device to emit light;

an initialization module configured to simultaneously write an initialization voltage into both the control terminal of the drive module and an anode of the light-emitting device;

a data write module configured to transmit a data voltage to the drive module; and a storage module configured to store the voltage of the control terminal of the drive module; and at least one reused signal line; and for each sub-pixel of the plurality of sub-pixels, an input terminal of the initialization module in the pixel circuit and a cathode of the light-emitting device are electrically connected to one reused signal line of the at least one reused signal line,; and each reused signal line of the at least one reused signal line is configured to:

in an initialization stage, provide the initialization voltage for the initialization module connected to the respective reused signal line and in a light emission stage, provide a cathode voltage for the cathode of the light-emitting device connected to the respective reused signal line, wherein the pixel circuit of each sub-pixel of the plurality of sub-pixels further comprises at least one light emission control module, the at least one light emission control module further comprises a first light emission control transistor, a second light emission control transistor, and a third light emission control transistor, a first electrode of the third light emission control transistor is connected to the cathode of the light-emitting device, a second electrode of the third light emission control transistor is connected to the at least one reused signal line, and a gate of the third light emission control transistor is connected to a light emission control signal line.

17. The display device of claim 16, wherein the plurality of sub-pixels further comprises:

at least one first sub-pixel, at least one second sub-pixel, and at least one third sub-pixel; and the at least one reused signal line further comprises:

a first reused signal line, a second reused signal line, and a third reused signal line; wherein the input terminal of the initialization module in the pixel circuit of the at least one first sub-pixel and the cathode of the light-emitting device of the at least one first sub-pixel are electrically connected to the first reused signal line;

the input terminal of the initialization module in the pixel circuit of the at least one second sub-pixel and the cathode of the light-emitting device of the at least one second sub-pixel are electrically connected to the second reused signal line; and the input terminal of the initialization module in the pixel circuit of the at least one third sub-pixel and the cathode of the light-emitting device of the at least one third sub-pixel are electrically connected to the third reused signal line.

18. The display device of claim 16, wherein the at least one reused signal line further comprises:

a plurality of reused signal lines configured to respectively provide different cathode voltages for cathodes of light-emitting devices of different types of sub-pixels among the plurality of sub-pixels.

19. The display device of claim 16, wherein the at least one reused signal line further comprises:

a plurality of reused signal lines configured to be respectively connected to different output terminals of a driver chip.

20. The display device of claim 16, wherein the at least one reused signal line further comprises:

a plurality of reused signal lines configured to respectively transmit different initialization voltages to input terminals of initialization modules of different types of sub-pixels among the plurality of sub-pixels.

* * * * *